United States Patent Office 3,099,643
Patented July 30, 1963

3,099,643
POLYSULFIDE RUBBER AND METHOD OF MAKING THE SAME
Morris B. Berenbaum and Norman A. Rosenthal, Levittown, Pa., and Hans Z. Lecher, Plainfield, N.J., assignors to Thiokol Chemical Corporation, Bristol, Pa., a corporation of Delaware
No Drawing. Filed Oct. 1, 1959, Ser. No. 843,625
8 Claims. (Cl. 260—79.1)

This invention relates to polysulfide polymers, and more particularly to rubbery polysulfide polymers having improved low temperature characteristics and a broad useful temperature range.

Rubber-like polysulfide polymers and liquid polysulfides convertible by curing to rubbery materials have been manufactured and sold for many years under the registered trademark "Thiokol." The methods of making such products and the properties and uses of the products have been extensively described in the published literature. Such publications include for example U.S. Patent 2,466,963, which lists at column 5 thereof a number of earlier related patents, and articles by Fettes and Jorczak published in Industrial and Engineering Chemistry, volume 42, page 2217 (1950), and volume 43, page 324 (1951).

The polysulfide polymers that are most widely used commercially at the present time are liquid polymers prepared from bis-beta chloro-ethyl formal and are essentially composed or recurring

groups. However a variety of other polymers of types referred to in the foregoing publications are made and sold in smaller quantities.

It is well known that the polysulfide rubbers are outstanding in their resistance to liquid hydrocarbons, and because of this property they have been extensively used for the manufacture of gasoline hoses. Also they have found wide use as sealants in the wing tanks of aircraft wherein their ability to adhere firmly to metals combined with their resiliency and their inertness to aircraft fuels enable them to form effective and long-lasting seals, notwithstanding the deformation and vibration to which such seals are subjected during flight of the aircraft. More recently such polymers have been used in large quantities as the fuel-binder of solid propellants for rockets. For this application the fuel-binder must have sufficient resiliency to prevent cracking of the propellant body due to physical shock encountered during handling of the motor and due to thermal shock caused by the very high temperature gradients through the propellant body that are generated when the propellant is ignited.

It is evident that a resilient material is required for all of the foregoing applications and in most cases retention of resiliency at relatively low temperatures is an important consideration. The polysulfide rubbers like natural rubber and the common synthetic rubbers, tend to become hard and brittle at low temperatures. To some extent this difficulty can be alleviated by the use of special compounding techniques including the blending of different polymers and the use of various plasticizers. However, the use of such techniques usually affects adversely other desired properties of the rubber and in many cases merely postpones embrittlement of the polymer.

It is accordingly an object of the present invention to provide a novel polysulfide rubber having improved low temperature properties. It is another object of the invention to provide polysulfide rubber that retains its resiliency and adhesiveness to metals over a relatively wide temperature range. It is still another object of the invention to provide a polysulfide rubber that remains resilient at a lower temperature and retains its resiliency at reduced temperatures for a longer period of time than the polysulfide rubbers previously available. It is a still further object of the invention to provide a method of making such polymers. Other objects of the invention will be in part obvious and in part pointed out hereinafter.

As conducive to a clearer understanding of the present invention, it may be pointed out that as their temperature is reduced polysulfide rubbers, like the common rubbers, reach a fairly well-defined temperature at which they become brittle. This "embrittlement" temperature is variously called the second order transition temperature or glass transition temperature and will be referred to herein for convenience as $T_g$. At temperatures somewhat above the $T_g$, hardening of the rubber due to crystallization commonly occurs over a period of time, the length of the time period being dependent upon the nature of the rubber and the temperature to which the rubber is subjected.

It is known that some improvement in $T_g$ can be obtained by increasing the length of the hydro-carbon chains used in preparing the polymer. For example, the polymer prepared from bis-delta-chlorobutylformal has a $T_g$ of $-105°$ F. as compared with a $T_g$ of $-71°$ F. for the polymer prepared from bis-beta-chloroethylformal. On the other hand previous experimental work has indicated that polymers having longer hydrocarbon chains crystallize more readily at temperatures above their $T_g$. Thus, whereas an ethyl-formal polymer maintained at $-20°$ F. hardened to a shore A durometer value of 70 over a period of fourteen months, a corresponding butyl formal polymer maintained at $-20°$ F. attained a durometer hardness of 82 in the course of nineteen hours. Also it has been found that polymers containing $C_5$ and $C_6$ radicals lose their resiliency due to crystallization even at room temperature.

It has now been found that contrary to what would be expected from the foregoing facts, polysulfide polymers can be prepared from dihalides of the formula $C_{12}H_{24}X_2$ which have good resiliency and excellent low temperature properties. More particularly, these polymers have $T_g$ values within the range $-110°$ to $-120°$ F. and are capable of retaining their resiliency when kept at $-40°$ F. for periods of as long as five months. It has been further found that such polymers are stable at relatively high temperatures and that thermal decomposition of such polymers occurs only above $250°-260°$ C. Since these results were obtained without any compounding of the polymer, presumably even better results can be obtained by compounding and addition of suitable modifying agents to such polymers.

The starting material for preparation of the present polymers may be conveniently prepared from 1,3-butadiene by a recently available process. In accordance with the disclosure of U.S. Patent 2,850,538, saturated $C_{12}$ glycols can be prepared by dimerizing butadiene in the presence of sodium and a dialkyl ether, reacting the resulting product with ethylene oxide, hydrolyzing the reaction mixture to form $C_{12}$ unsaturated glycol, and hydrogenating to produce saturated glycols. The glycols thus produced can be converted to omega-omega dihalides by any of various known processes including reaction with hydrohalogen acids, followed by distillation to remove excess acid and water.

The foregoing process normally produces a mixture of three isomers. Thus a typical mixture resulting from this process may comprise 30% by weight of a linear omega-omega $C_{12}$ dihalide, 55% by weight of an ethyl-substituted $C_{10}$ omega-omega dihalide, and 15% by weight of a diethyl-substituted $C_8$ omega-omega dihalide. While such a mixture may be used as such as a starting material for preparation of the present polymers, it has been found that better properties are achieved if only the branched chain dihalides are used. Thus it is preferable to remove by recrystallization the straight chain $C_{12}$ dihalide from the mixture and employ as a starting material the resulting mixture of the ethyl $C_{10}$ and diethyl $C_8$ dihalides.

In general, the present polymers can be prepared by methods similar to those previously used in preparing polysulfide polymers from lower molecular weight dichlorides, i.e., by reacting the dichlorides with aqueous alkali metal polysulfides. However, it has been found necessary to carry out the reaction at higher temperatures and pressures than those previously used, i.e., elevated pressures of up to 500 p.s.i. and temperatures of 100° to 200° C.

In order to point out more fully the nature of the present invention the following specific examples are given of methods of preparing the present polymers.

EXAMPLE 1

An aqueous solution of $Na_2S_{2.25}$ was prepared having a concentration such that 530 ml. of the solution contained 1.2 moles of polysulfide. An autoclave equipped with a mechanical stirrer, thermometer, and dropping feed arrangement, was charged with 530 ml. of this solution and 265 ml. of methanol. There was then added to the autoclave 7.5 ml. of Nekal solution (5% aqueous alkyl naphthalene sulfonic acid), 3.1 ml. of NaOH solution (50% concentration), and 21.8 ml. of $MgCl_2$ solution (25% concentration) to produce a magnesium hydroxide dispersion in the polysulfide solution. This mixture was heated 102° C. and the pressure in the autoclave adjusted to 200 p.s.i.

The dichloride feed comprised a mixture of ethyl $C_{10}$ omega-omega dichloride and diethyl $C_8$ omega-omega dichloride in a ratio of about 55:15. A mixture consisting of 0.7 mole (166 grams) of this dichloride and 0.014 mole (2.1 grams) of 1,2,3-trichloro propane was prepared and added dropwise to the polysulfide solution over a period of thirty minutes. The temperature of the reaction mixture was then brought to 120° C. and maintained at this temperature for about four hours to produce a polysulfide polymer in latex form. The latex was removed from autoclave and washed free of excess polysulfide with water. The product thus obtained was still soft and so was toughened according to the following procedure: The latex was reintroduced into the autoclave with 725 ml. of 2.35 molar $Na_2S_{2.25}$ and heated at 160° C. under 200 p.s.i. pressure for four hours. The resulting latex was washed free of polysulfide and then subjected to a second toughening treatment. In the second treatment the latex was mixed with 1486 ml. of $Na_2S_{2.25}$ containing 2.4 moles of the polysulfide and heated at 180° C. and 200 p.s.i. for an additional four hours. The resulting latex was washed free of polysulfide with water and coagulated. The coagulated product had a hardness of 25 as measured on the shore A durometer at room temperature.

A sample of this material was put in a refrigerated container which was set to hold a constant temperature of −40° C. From time to time the hardness of the samples was determined using a shore A–Z durometer #4518. The results are given in the following table.

Table I

| Hours at −40° C.: | Hardness |
|---|---|
| 3 | 44 |
| 144 | 44 |
| 600 | 47 |
| 1166 | 45 |
| 2630 | 44 |
| 3590 | 46 |

The foregoing data show that there was no significant change in the hardness of this material at a temperature of −40° C. over a period of about four months.

EXAMPLE 2

An autoclave equipped with an agitator was charged with 430 ml. of 2.28 molar $Na_2S_{2.23}$. With the agitator running, dispersants were added as in Example 1, namely, 7.5 of Nekal solution, 3.1 ml. of concentrated aqueous caustic soda and 21.8 ml. of magnesium chloride solution. After the dispersants had been added the agitator was turned off and the autoclave sealed.

The dihalide used in this example comprised a mixture of etheyl $C_{10}$ omega-omega dibromide and diethyl $C_8$ omega-omega dibromide in a ratio of about 55:15. A mixture was prepared of 321.4 grams (0.98 mole) of the $C_{12}$ dibromide and 2.95 grams (0.02 mole) of 1,2,3 trichloropropane. This mixture was placed in a feed bomb that was connected through a feed valve to the autoclave. The mixture in the feed bomb was placed under a nitrogen pressure of 100 p.s.i. and the bomb was sealed.

The agitator of the autoclave was then started and heating of the autoclave begun. When the mixture in the autoclave reached 100° C., the feed valve in the conduit leading from the feed bomb to the autoclave was opened an amount which caused the feed mixture to flow into the autoclave over a period of about an hour. The temperature was held at 100° C. during this period.

When addition of the feed mixture was complete, the feed valve was closed and the feed bomb opened and charged with about 250 ml. of methanol. The bomb was then re-pressured with 100 p.s.i. nitrogen. Heating of the autoclave at 100° C. was continued for about 20 minutes after the feed period; then the methanol charge in the feed bomb was run into the autoclave. The autoclave temperature was raised to 120° C. and the pressure to 200 p.s.i.

Three and one half hours after addition of the methanol, heating of the autoclave was terminated and its contents were allowed to cool to room temperature. Thereafter 610 ml. of aqueous $Na_2S_{2.23}$ containing 1.7 moles of the polysulfide was added to the autoclave and the mixture heated at 160° C. under 200 p.s.i. nitrogen for eight hours. The product was cooled, taken out of the autoclave, washed with water, and re-charged to the autoclave. 1220 ml. of aqueous $Na_2S_{2.23}$ containing 2.4 moles of the polysulfide was added and the mixture heated at 180° for four hours at 200 p.s.i. The product was cooled, removed from the autoclave and washed until free from sulfide by the lead acetate paper test. It was then put in an oven at 158° F. and on prolonged drying, dried to a soft rubber.

This product, like that of Example 1, showed no significant change in hardness when maintained at −40° C. over a period of several months.

It is of course to be understood that the foregoing examples are intended to be illustrative only and that numerous changes can be made in the proportions, ingredients and conditions set forth without departing from the spirit of the invention as set forth in the appended claims.

We claim:

1. A method of making a polysulfide polymer having improved low temperature properties which comprises reacting at least one dihalide of the formula $C_{12}H_{24}X_2$ wherein X is a halogen atom, with an aqueous alkali metal polysulfide to form a rubbery polymer essentially composed of $C_{12}H_{24}$ groups interconnected by polysulfide linkages, said $C_{12}H_{24}$ groups being ethyl-substituted alkylene groups.

2. A method according to claim 1 and wherein said dihalide is an omega-omega dihalide.

3. A method according to claim 2 and wherein said omega-omega dihalide is a dichloride.

4. A method according to claim 2 and wherein said omega-omega dihalide is a dibromide.

5. A method according to claim 1 and wherein said dihalide is mixed with a small amount of trichloropropane before being reacted with said aqueous alkali metal polysulfide to form a polymer having a degree of cross-linking.

6. A rubbery polysulfide polymer essentially wholly composed of recurring $RS_n$ groups interconnected through their sulfur atoms to form polysulfide linkages, "$n$" being an integer from 2 to 4 and "R" being an aliphatic hydrocarbon radical having 12 carbon atoms, said hydrocarbon radicals being ethyl-substituted alkylene groups.

7. A polymer according to claim 6 and wherein "R" is a divalent radical selected from ethyl-decenyl, diethyl-octenyl and mixtures thereof.

8. A method of making a polysulfide polymer having improved low temperature properties which comprises reacting at least one dihalide of the formula $C_{12}H_{24}X_2$ with an aqueous alkali metal polysulfide at an elevated pressure and a temperature of 100° to 200° C. to form a rubbery polymer essentially composed of $C_{12}H_{24}$ groups interconnected by polysulfide linkages, said $C_{12}H_{24}$ groups being ethyl-substituted alkylene groups.

References Cited in the file of this patent
UNITED STATES PATENTS

| | | |
|---|---|---|
| 2,142,145 | Patrick | Jan. 3, 1939 |
| 2,206,643 | Patrick | July 2, 1940 |
| 2,221,650 | Patrick | Nov. 12, 1940 |